Figure 1:
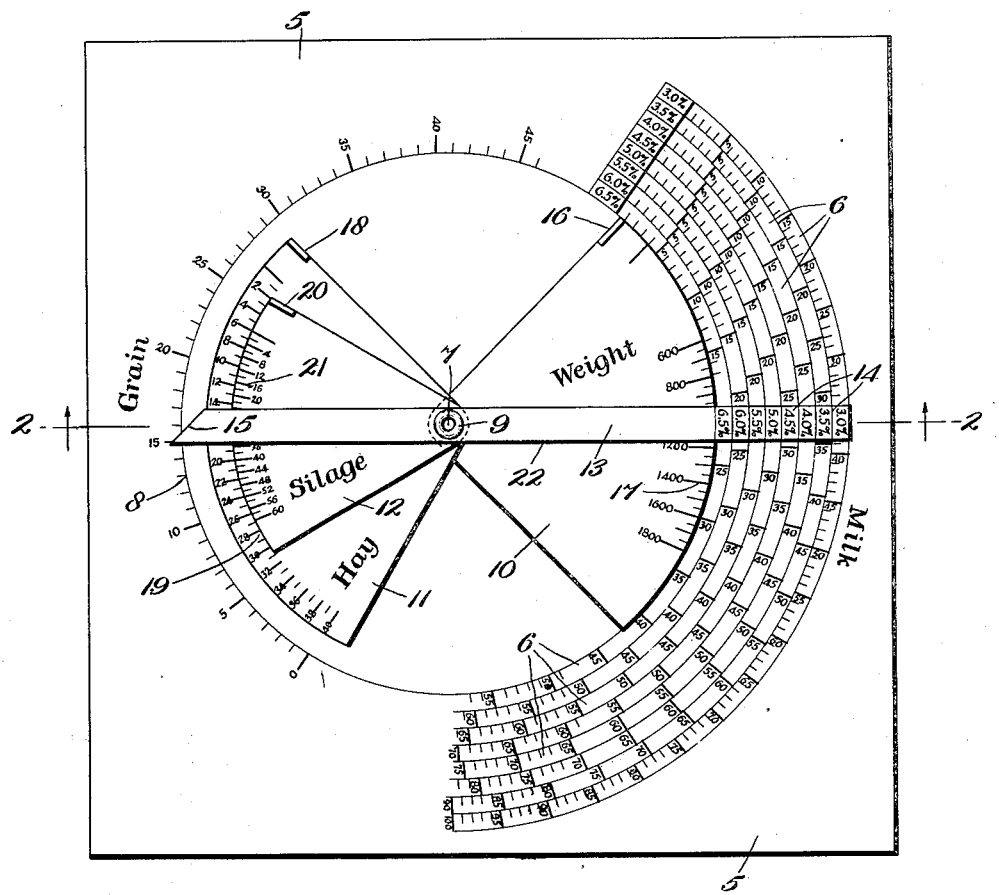

Aug. 15, 1933.     T. E. WOODWARD     1,922,465
CALCULATOR
Filed April 29, 1932

Inventor
T. E. Woodward,

By Barker & Collings
Attorneys

Patented Aug. 15, 1933

1,922,465

UNITED STATES PATENT OFFICE 1,922,465

CALCULATOR

Thompson E. Woodward, College Park, Md.

Application April 29, 1932. Serial No. 608,290

6 Claims. (Cl. 235—78)

This invention relates to calculators, and has for one of its objects the provision of a calculator for quickly and accurately determining the quantity of one or more different kinds of feed necessary to be provided for consumption by livestock in order to accomplish the most economical nutrition thereof.

The nutritive requirements of certain classes of livestock have been the subject of considerable research by various investigators, both in this country and abroad, and the results of such investigations are in sufficiently close agreement that may be considered correct for all practical purposes. This research has shown that the quantity of feed required by any particular animal depends upon its size, the energy expended in physical effort as exercise or work, and in the case of dairy animals, upon the quantity and composition of the milk to be produced.

The nutritive values of various stock feeds, such as hay, grain, silage and the like, have also been quite accurately determined, and it has been recognized that if the proper attention were given to the feeding of only substantially the exact amounts of the various feeds, in accordance with their nutritive values, to just meet the nutritive requirements of a particular animal, an efficiency closely approaching or even attaining the theoretical maximum might be attained, with obvious economy in feeding costs. For example, of the twenty-four million dairy cows in this country today, practically none are fed with any particular regard to their actual nutritive needs, whereas if their feeding was conducted on a scientific basis in accordance with the conclusions reached as the result of the above mentioned investigations, several millions of dollars might be saved annually.

One of the principal reasons for the failure to take advantage of the benefits to be gained by such feeding is the amount of clerical work involved in computing the exact quantities or ratios of feeds required, since because of the variable factors above mentioned, the needs of each animal may be and usually are different from all others. It is the principal object of the present invention, therefore, to provide a simple device which may be employed for quickly and accurately showing the quantity of feed required by any particular animal to exactly meet its nutritive requirements.

With the above and other objects in view which will appear as the description proceeds, the invention consists in the novel details of construction and combinations of parts more fully hereinafter described and particularly pointed out in the appended claims.

Referring to the accompanying drawing forming a part of this specification in which like reference characters designate like parts in all the views:—

Figure 2:
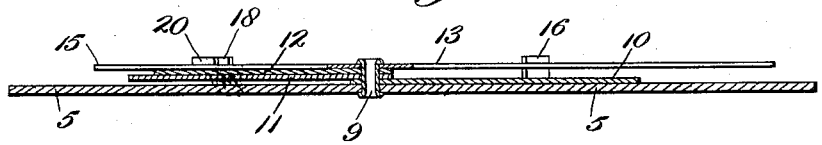

Figure 1 is a plan view of one form of calculator constructed in accordance with the present invention; and Figure 2 is a transverse sectional view, taken approximately on the plane indicated by the line 2—2 of Figure 1.

Although as above indicated the device is susceptible of use in calculating the feed requirements of various animals, for the purpose of illustration it has been shown as designed for the determination of the quantity of feed necessary for dairy cows. As will be understood from the drawing, the calculator comprises a base member 5, here shown as being substantially square in plan, at the right hand side of which, as viewed in Figure 1, there is provided a plurality of graduated scales 6 arranged as arcs of concentric circles struck from a center 7. The graduations of these said scales represent in this instance the units of weight or volume of the milk to be obtained from a cow, and the several scales are calculated for the various butter fat contents commonly found in milk, as indicated by the various percentage indicia appearing at the upper ends of the said scales.

At the opposite side of the base member 5 there is provided a scale 8 which is likewise arranged as an arc of a circle struck from the center 7, the graduations of which scale are calculated to give the units of weight or volume of a basic feed, such as grain, required for most efficient nutrition.

Coincident with the center 7 the base member 5 carries a suitable pivot 9 here shown as comprising a tubular eyelet and which serves as a pivot mounting for a plurality of sectors 10, 11 and 12 as well as for an arm or bar 13. The right hand end of the bar 13 as viewed in Figure 1 is arranged for cooperation with the various scales 6 and it may be lined or ruled substantially as indicated to correspond with these various scales and it may further be provided with percentage designations 14 corresponding with those appearing at the head of the respective scales, to facilitate the reading of the device when the arm is moved away from the zero point. The other end of the said arm 13 may be beveled as indicated at 15 to provide a pointer adapted to co-act with the grain scale 8 as will be readily understood.

The pivoted sector 10 is preferably provided with an upstanding lug 16 by means of which it may be manipulated about the pivot 9 and which also serves as a stop for engagement with the upper edge of the bar 13 as will appear more fully below. The said sector 10 is furthermore provided with a series of graduations constituting a scale 17, which designate the weight of the animal, as indicated in Figure 1.

The sector 11 is provided with an upstanding lug 18 similar to the lug 16 of sector 10 and with a series of graduations constituting a scale 19 which may be employed to indicate various quantities of hay, for example. In like manner the sector 12 is provided with a lug 20 and a series of graduations constituting a scale 21 which may designate various quantities of silage. It is of course to be understood that the space graduations of the various scales are worked out in advance in accordance with the conclusions reached as the result of the above mentioned investigations as to the nutritive values of the different feeds, and said graduations may be engraved, stamped, or printed as desired upon the various members carrying them.

In using the device for calculating the quantities of the various feeds required for the most economical nutrition of a dairy cow, the average yield of milk and the butter fat content thereof having been determined, the arm 13 is swung about the pivot 9 to bring the lower or indicating edge 22 thereof in alignment with the quantity graduation of the appropriate scale 6. The sector 10 is then swung about the pivot 9 to bring the lug 16 into engagement with the upper edge of the arm 13 after which the said sector is held against movement while the arm 13 is swung in a clockwise direction to bring its indicating edge 22 into alignment with the graduation of scale 17 which represents the weight of the animal for which the calculation is being made. The beveled end 15 of the arm 13 is thus brought to indicate upon the scale 8 the amount of the basic feed, such as grain, which will be necessary to exactly meet the nutritive requirements of this animal for the production of the particular quantity of milk yielded, and having the butter fat content previously determined.

If the animal were to be fed wholly upon grain the quantity thus indicated on the scale 8 would be the final result. However, it is not ordinarily the practice to feed grain alone but to combine therewith varying amounts of hay and in many instances, silage. Of course these additional feeds have certain nutritive values which may be substituted for equal values of grain, and if it be desired to employ certain amounts of these other feeds in connection with the grain, the reduction in the amount of grain can be readily calculated by this device through manipulation of the sectors 11 and 12 and movements of the arms 13.

In other words, if it be desired to substitute a certain amount of hay, say 10 lbs. for an equivalent amount of grain based upon the relative nutritive values of the two, with the arm 13 held in the position it has last assumed, the sector 11 will be swung in a counter-clockwise direction to bring its lug 18 into engagement with the said arm, whereupon it is held upon further movement while the arm itself is swung to the graduation indicating 10 lbs. upon scale 19. Such movement will of course move the beveled end 15 of the arm in such direction as to reduce the quantity of grain indicated on the scale 8, and will indicate only the quantity of grain which must be provided in addition to the selected amount of hay.

In like manner if it be desired to also feed silage to the animal the further reduction in the required amount of grain may be readily calculated and the deduction made by swinging the sector 12 in a counter-clockwise direction, while holding the arm 13 in its last assumed position, until the lug 20 engages with the arm, whereupon by moving the arm in a counter-clockwise direction until its indicating edge 22 registers with the graduation of scale 21 representing the quantity of silage to be employed, the indicating end 15 of arm 13 will be moved relative to scale 8 to indicate the quantity of grain necessary in addition to the hay and silage.

In this instance grain has been used as the base feed, and it has been assumed that the quantities of substitutes therefor in the form of hay and silage are arbitrarily determined by the stock feeder, so that the nutritive values of these arbitrary amounts are substituted for corresponding nutritive values of the grain or base feed.

The calculator of course may be constructed of any suitable material such as metal, celluloid, cardboard and the like, as may be desired.

While one form of the invention has been illustrated and described, it is obvious that those skilled in the art may vary the details of construction as well as the precise arrangement of parts without departing from the spirit of the invention, and it is therefore not wished to be limited to the above disclosure except as may be required by the claims.

What is claimed is:

1. In a calculator for livestock feed, a member provided with one or more graduated scales representative of the product to be obtained from the animal, and with a separate graduated scale representative of quantities of a basic feed; a graduated scale representative of varying animal weights; and a member arranged through movement relative to said product and weight scales to indicate upon said basic-feed scale the quantity of such basic feed necessary to provide the most economic nutrition of an animal of given weight.

2. In a calculator for livestock feed, a member provided with one or more graduated scales representative of the product to be obtained from the animal, and with a separate but correlated graduated scale representative of quantities of a basic feed; a second member movable relative to the first and having a graduated scale representative of various animal weights; a third member arranged through movement relative to said product and weight scales to indicate upon said basic-feed scale the quantity of such basic feed necessary to most economically attain the desired product from an animal of given weight; and a fourth member movable relative to the others and having a graduated scale representative of quantities of a different feed which may be substituted in part for said basic feed, said third member being adapted when moved in cooperation with said substitute-feed scale to indicate upon said basic-feed scale the reduced quantity of such basic feed required when any given quantity of the substitute feed is employed.

3. In a calculator for livestock feed, a member provided with one or more graduated scales representative of the product to be obtained from the animal, and with a separate graduated scale representative of quantities of a basic feed; a second member movable relative to the first and having a graduated scale representative of various animal weights; a third member arranged through properly correlated movements relative to said product and weight scales to indicate upon said basic-feed scale the quantity of such basic feed necessary to provide the most economic nutrition for an animal of given weight; and a plurality of additional members, each movable relative to the others and to each other, and each having a graduated scale representative of quantities of other feeds which may be substituted in part for said basic feed, said third member when moved in successive cooperation with said substitute-feed scales indicating upon said basic feed scale the reduced quantity of such basic feed required when any given quantities of said substitute feeds are employed.

4. In a calculator for livestock feed, a base member provided at one side with a plurality of graduated scales representative of different quantities and compositions of the product to be obtained from the animal, and at its other side with a graduated scale representative of quantities of a basic feed; a second member pivoted to said base member and having a graduated scale representative of various animal weights; an indicator bar also pivoted to said base member with its opposite end portions cooperating respectively with said product and basic-feed scales; and a plurality of additional members pivoted to said base member, each having a graduated scale representative of quantities of other feeds which may be substituted in part for the basic feed, said indicator bar being arranged through properly correlated movements thereof and of said weight- and substitute-feed-scale carrying members, to indicate upon said basic-feed scale the quantity of such basic feed necessary to most economically attain the desired product from an animal of given weight when definite quantities of the substitute feeds are employed.

5. In a calculator for livestock feed, a base member provided at one side with a plurality of arcuate graduated scales representative of different quantities and compositions of the product to be obtained from the animal, and at its other side with a separate but correlated arcuate graduated scale representative of quantities of a basic feed; a pivot intermediate said product and basic-feed scales; a sector mounted on said pivot for movement adjacent said product scales, and having a graduated scale representative of various animal weights; a plurality of additional sectors also mounted on said pivot, for movement adjacent said basic-feed scale, each provided with a graduated scale representative of quantities of other feeds which may be substituted in part for the basic feed; and an indicator bar mounted on said pivot with one end thereof cooperating with said product and weight scales, and the other end thereof cooperating with said basic- and substitute-feed scales, said bar being arranged through properly correlated movements thereof and of said weight- and substitute-feed-scale sectors, to indicate upon said basic-feed scale the quantity of the basic feed necessary to provide the most economic nutrition of an animal of given weight when definite quantities of the substitute feeds are employed.

6. In a calculator for livestock feed, a base member having graduated scales representative of different quantities and compositions of the product to be obtained from the animal, a second scale representative of quantities of a basic feed, a third scale representative of various animal weights, fourth and fifth scales representative of quantities of other feeds which may be substituted in part for said basic feed, an indicator member movable relative to said base member and scales, said scales being so correlated that movement of said indicator member relative to the first and third scales will indicate upon the second scale the quantity of basic feed required for the most economic nutrition of an animal of given weight, and further movement of said indicator member relative to said fourth and fifth scales, will vary the indication of said basic feed by an amount equivalent to the substitutive value of the selected quantities of said other feeds.

THOMPSON E. WOODWARD.